(12) United States Patent
Mayernick et al.

(10) Patent No.: US 9,903,220 B2
(45) Date of Patent: Feb. 27, 2018

(54) COST REDUCED VARIABLE GEOMETRY TURBOCHARGER WITH STAMPED ADJUSTMENT RING ASSEMBLY

(75) Inventors: Nicholas Mayernick, Fletcher, NC (US); Rajendra Vemula, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 781 days.

(21) Appl. No.: 13/581,112

(22) PCT Filed: Feb. 23, 2011

(86) PCT No.: PCT/US2011/025835
§ 371 (c)(1),
(2), (4) Date: Aug. 24, 2012

(87) PCT Pub. No.: WO2011/109198
PCT Pub. Date: Sep. 9, 2011

(65) Prior Publication Data
US 2012/0315164 A1    Dec. 13, 2012

Related U.S. Application Data

(60) Provisional application No. 61/310,019, filed on Mar. 3, 2010.

(51) Int. Cl.
F01D 17/16    (2006.01)
F02C 9/22    (2006.01)
(Continued)

(52) U.S. Cl.
CPC ............. F01D 17/165 (2013.01); F02C 6/12 (2013.01); F02C 9/22 (2013.01); F02B 37/24 (2013.01);
(Continued)

(58) Field of Classification Search
CPC ... F01D 7/16; F01D 7/165; F02C 9/22; F05D 2230/10; F05D 2230/41; F05D 2230/54; F05D 2230/60
(Continued)

(56) References Cited

U.S. PATENT DOCUMENTS 6,916,153 B2 *   7/2005   Boening ..................... 415/163
7,406,826 B2 *   8/2008   Hayashi et al. ................ 60/602
(Continued)

FOREIGN PATENT DOCUMENTS

CN          1324981          12/2001
JP          2009-114986       5/2009
(Continued)

Primary Examiner — Jason Shanske
Assistant Examiner — Jesse Prager
(74) Attorney, Agent, or Firm — Eric L. Doyle; Stephan A. Pendorf; Patent Central LLC

(57) ABSTRACT

A variable geometry turbocharger is simplified yet able to reliably operate in a robust, cost effective manner. The adjusting ring assembly has a reduced number of parts in the vane adjusting assembly but still operates as it did with the parts in the conventional assembly, but at lower part and capital cost. The adjusting ring is constrained axially and radially by interaction with an inner diameter and an abutment provided in the upper vane ring of the vane pack.

7 Claims, 10 Drawing Sheets

(51) Int. Cl.
  *F02C 6/12* (2006.01)
  *F02B 37/24* (2006.01)
(52) U.S. Cl.
  CPC ..... *F05D 2230/54* (2013.01); *Y10T 29/49245* (2015.01)
(58) Field of Classification Search
  USPC .................................................. 415/160–166
  See application file for complete search history.

(56) References Cited

U.S. PATENT DOCUMENTS

| | | | |
|---|---|---|---|
| 8,104,280 B2 * | 1/2012 | Akita | 60/602 |
| 8,480,356 B2 * | 7/2013 | Takahiro | 415/159 |
| 2002/0098081 A1 | 7/2002 | Ertl et al. | |
| 2009/0022581 A1 | 1/2009 | Tries et al. | |
| 2009/0252601 A1 * | 10/2009 | Wengert et al. | 415/163 |
| 2010/0014961 A1 | 1/2010 | Ralf et al. | |
| 2011/0182717 A1 * | 7/2011 | Tries et al. | 415/160 |

FOREIGN PATENT DOCUMENTS

| | | |
|---|---|---|
| KR | 10-2009-0007728 | 1/2009 |
| WO | WO 2007112910 A1 * | 10/2007 |
| WO | 2009-003144 | 12/2008 |
| WO | 2009-081642 | 7/2009 |

* cited by examiner

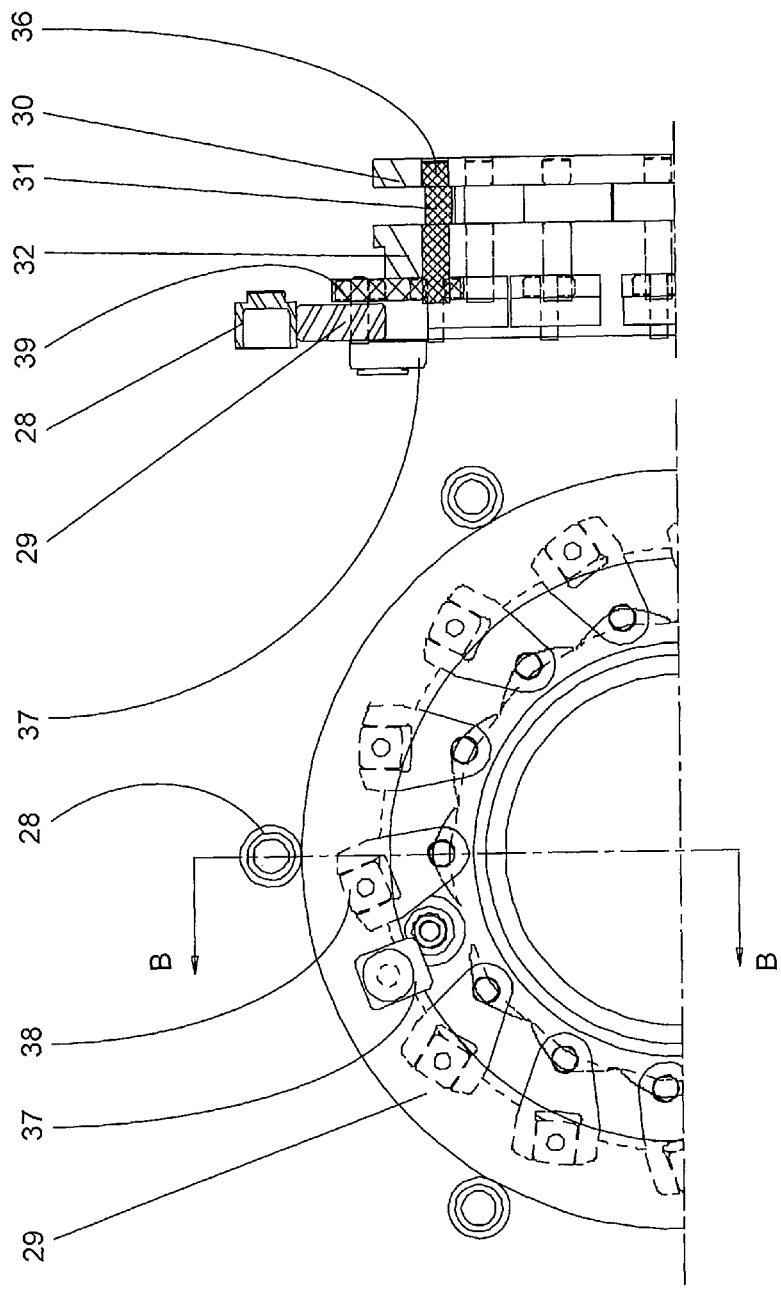

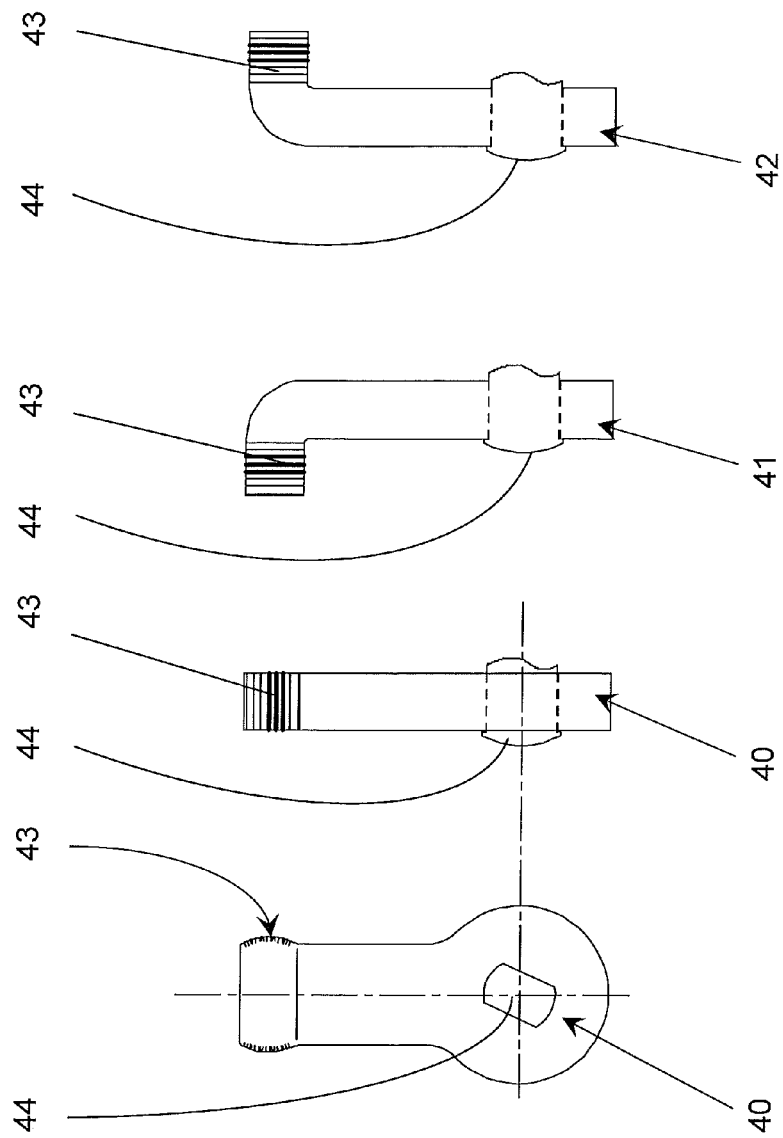

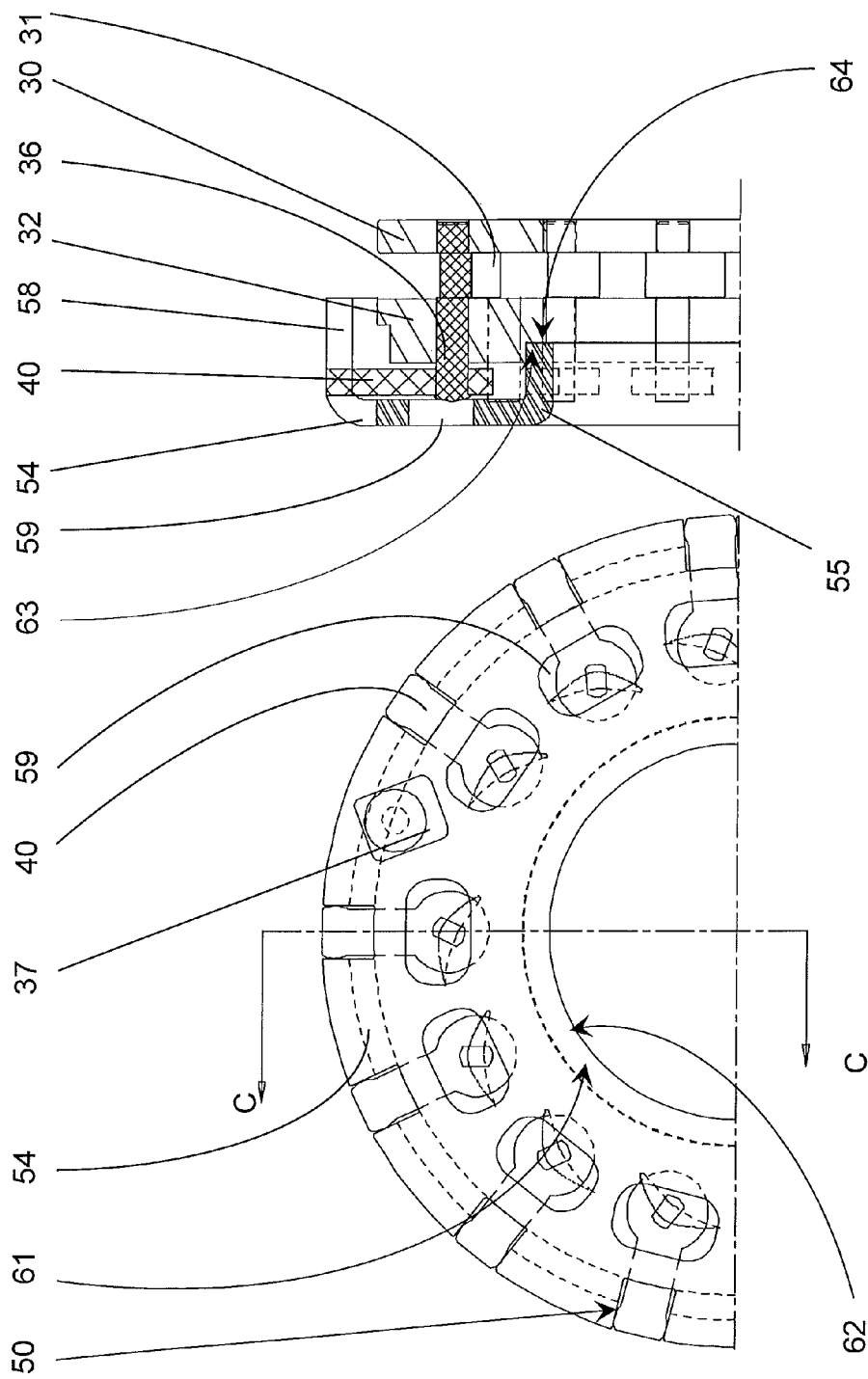

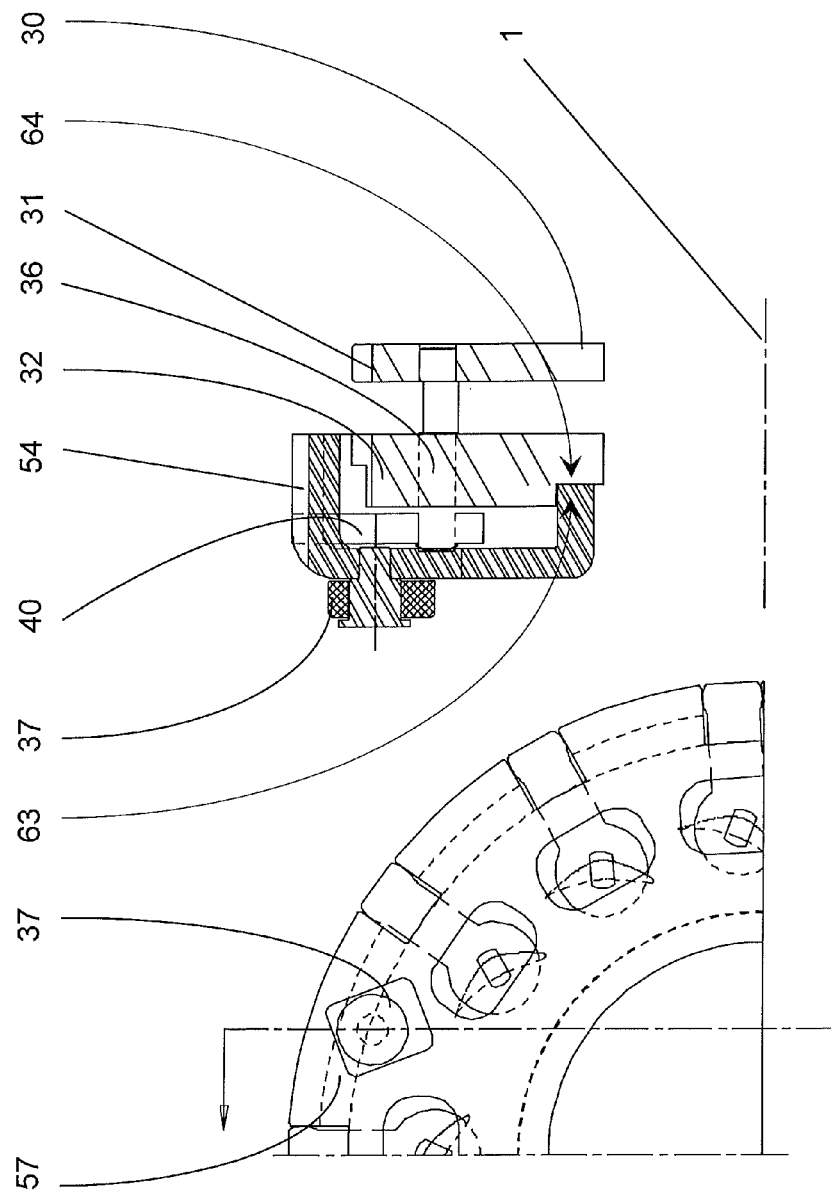

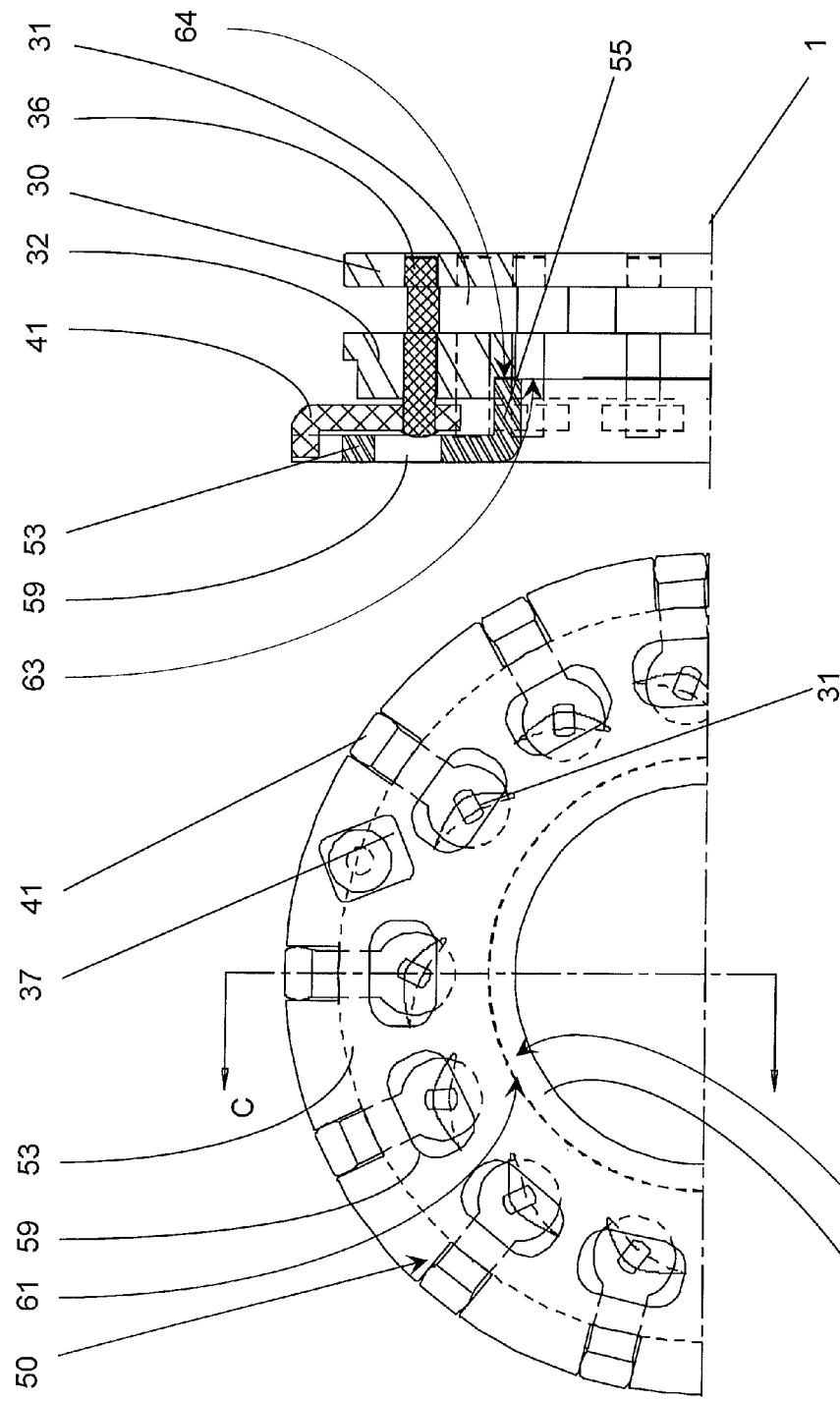

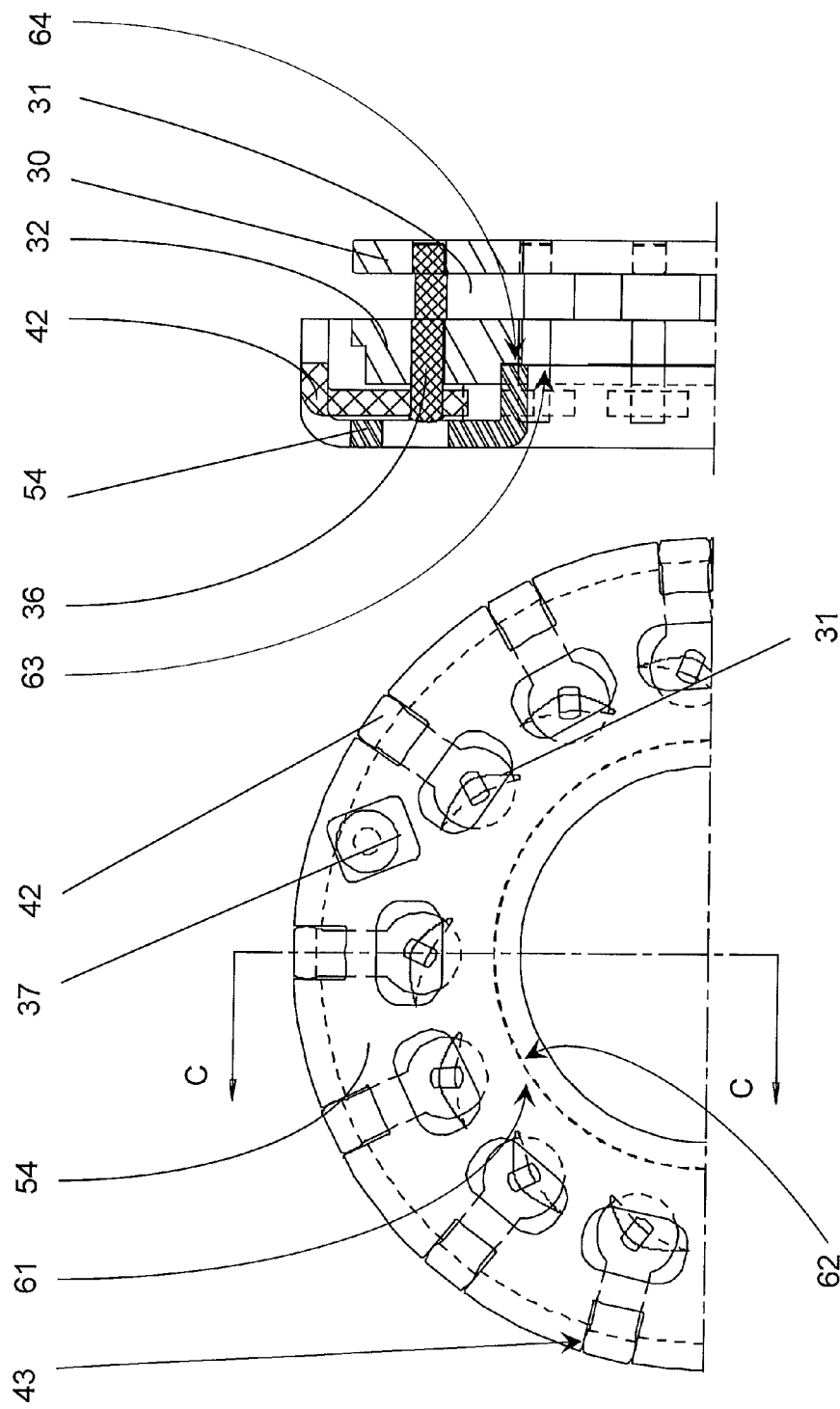

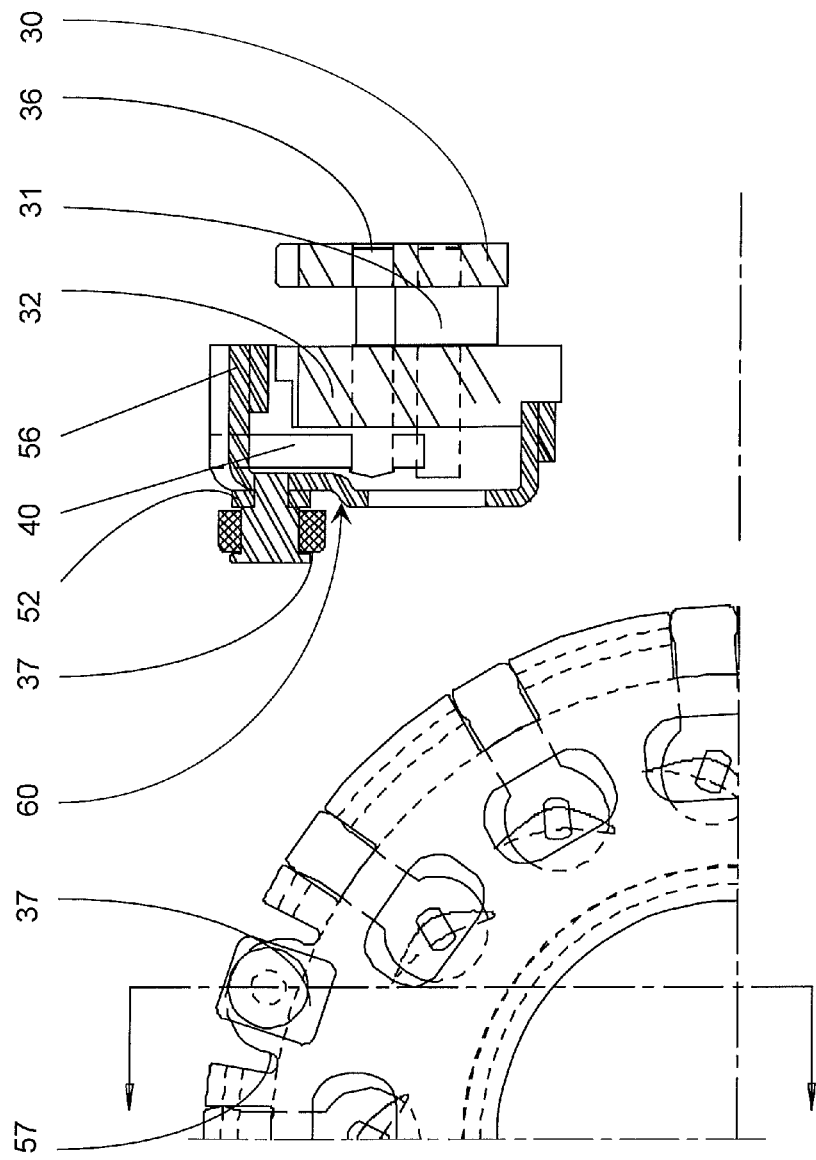

COST REDUCED VARIABLE GEOMETRY TURBOCHARGER WITH STAMPED ADJUSTMENT RING ASSEMBLY

FIELD OF THE INVENTION

This invention addresses the need for a variable geometry turbocharger with reduced cost, and accomplishes this by using a stamped adjusting ring assembly.

BACKGROUND OF THE INVENTION

Turbochargers are a type of forced induction system. They deliver air, at greater density than would be possible in the normally aspirated configuration, to the engine intake, allowing more fuel to be combusted, thus boosting the engine's horsepower without significantly increasing engine weight. This can enable the use of a smaller turbocharged engine, replacing a normally aspirated engine of a larger physical size, thus reducing the mass and aerodynamic frontal area of the vehicle.

Turbochargers (FIG. 1) use the exhaust flow (100), which enters the turbine housing at the turbine inlet (5) of a turbine housing (2), from the engine exhaust manifold to drive a turbine wheel (70), which is located in the turbine housing. The turbine wheel is solidly affixed to one end of a shaft, the other end of which contains a compressor wheel (20) which is mounted to the shaft and held in position by the clamp load from a compressor nut. The primary function of the turbine wheel is providing rotational power to drive the compressor. Once the exhaust gas has passed through the turbine wheel (70) and the turbine wheel has extracted energy from the exhaust gas, the spent exhaust gas (101) exits the turbine housing (2) through the exducer (6) and is ducted to the vehicle downpipe and usually to after-treatment devices such as catalytic converters, particulate traps and $NO_x$ traps.

The power developed by the turbine stage is a function of the expansion ratio across the turbine stage, which is the expansion ratio from the turbine inlet (5) to the turbine exducer (6). The range of the turbine power is a function of, among other parameters, the flow through the turbine stage.

The compressor stage consists of a wheel and its housing. Filtered air is drawn axially into the inlet (11) of a compressor cover (10) by the rotation of the compressor wheel (20). The power generated by the turbine stage to the shaft and wheel drives the compressor wheel (20) to produce a combination of static pressure with some residual kinetic energy and heat. The pressurized gas exits the compressor cover (10) through the compressor discharge (12) and is delivered, usually via an intercooler, to the engine intake.

The design of the turbine stage is a compromise among: the power required to drive the compressor at different flow regimes in the engine operating envelope; the aerodynamic design of the stage; the inertia of the rotating assembly, of which the turbine is a large part, since the turbine wheel is manufactured typically in Inconel, which has a density 3 times that of the aluminum of the compressor wheel; the turbocharger operating cycle, which affects the structural and material aspects of the design; and the near field both upstream and downstream of the turbine wheel with respect to blade excitation.

The basic turbocharger configuration is that of a fixed turbine housing. In this configuration, the shape and volume of the turbine housing volute is determined at the design stage and cast in place. The basic fixed turbine housing is the most cost-effective of the following options simply because it is the most simple and has the fewest parts.

The next level of sophistication is that of a wastegated turbine housing. In this configuration, the volute is cast in place, as in the fixed configuration above. The volute (21) is fluidly connected to the exducer (6) by a duct. Flow through the duct is controlled by a wastegate valve. Because the outlet of the wastegate duct is on the exducer side of the volute, which is downstream of the turbine wheel, flow through the wastegate duct, when in the bypass mode, bypasses the turbine wheel (70), thus not contributing to the power delivered to the turbine wheel.

The addition of a wastegate to the standard low cost fixed turbine stage adds a cost factor of approximately 16% to that of the fixed turbocharger.

The next level of sophistication in boost control of turbochargers is the VTG (the general term for variable turbine geometry). Some of these turbochargers have rotating vanes and some have sliding sections or rings. Some titles for these devices are: variable turbine geometry (VTG); variable geometry turbine (VGT); variable nozzle turbine (VNT); or simply variable geometry (VG).

VTG turbochargers utilize adjustable guide vanes mounted to rotate between a pair of vane rings and/or one vane ring and a nozzle wall. These vanes are adjusted to control the exhaust gas backpressure and the turbocharger speed by modulating the exhaust gas flow to the turbine wheel. In many configurations the shaft on which the vane rotates is mechanically connected to a vane arm situated above the upper vane ring. The vanes can be rotatably driven by forks engaged in an adjusting ring. In many configurations, the forks on the ends of the vane arms drive independently rotatable "slide blocks" to minimize friction in the system and to deal with the inevitable distortion and corrosion in the turbine housing, and thus the linkages. The adjusting ring must be allowed to rotate circumferentially with minimal friction, and must be aligned radially so that it remains concentric with the upper and lower vane rings (with the vane rings bracketing the vanes; "upper" being closer to the center housing, "lower" being closer to the turbine housing), and axially so that the blocks mounted to the vane ring remain in contact with the vane arms.

FIGS. 3A and 3B show a configuration in which the adjusting ring (33) is supported by ramparts (35) on the vane arms (34). A large block (37) is connected by a shaft to the adjusting ring (33). Circumferential motion of the singular large block (37) about the turbocharger center line (1) causes the adjusting ring (33) to rotate about the turbocharger center line (1). Rotation of the adjusting ring (33) about the turbocharger centerline (1) causes the multiple small blocks (38) to rotate about the turbocharger center line (1) while each of the blocks also rotate about the centerlines (27) of the vane shafts (36). This motion of the small blocks causes the vane arms (34) to rotate about the centerline (27) of the vane shaft (36) and change the angle of attack of the vanes to the exhaust flow. The rotating blocks are designed so that the interface between the block cheeks and the fork cheeks is predominantly sliding friction over the entire area of one cheek of the rotating block. This design provides uniform load distribution, which reduces wear and provides greater life than in line contact, but conversely raises friction over that of a line contact design.

In the example, depicted in FIGS. 3A and 3B, and discussed above, the adjusting ring (33) is constrained and supported by the axial and radial shapes fabricated on the ramparts (35) of the vane arms (34). In another example, depicted in FIGS. 4A and 4B, the adjusting ring is radially supported and constrained by a set of rollers (28) which are themselves either constrained by the turbine housing or upper vane ring. In this configuration, the vane arms (39) are flat and do not contain the ramparts of the prior example.

Turbine housings experience great temperature flux. The outside of the turbine housing is in contact with air at ambient temperature, while the volute surfaces are "wetted" by (are in flowing contact with) exhaust gases ranging from 740° C. to 1050° C., depending on the fuel used in the engine. The turbine housing also experiences large temperature flux from the inlet (5) to the outlet (6) which makes the snail shape volute want to unwind. If the volute shape is constrained in any manner, then the turbine housing tries to twist. Within the confines of these powerful thermal forces distorting the turbine housing, the vane pack (the assembly from lower vane ring (30) to the large turning block (37)) must be supported and constrained in multiple directions. The items in the vane pack are relatively accurate, so tolerances between items in the vane pack are relatively tight. This tight-tolerance design often causes the components of the vane pack to jam during these large thermal changes. Coupled with the need to use expensive-to-procure, machine, and weld (where required) exotic materials which can both tolerate the temperatures and be wetted by the high-temperature corrosive exhaust gas, the VTG becomes quite a costly option in a fiercely cost-competitive market.

If one considers a wastegated turbo as a baseline for cost, then the cost of a typical VTG, in the same production volume, is from 270% to 300% the cost of the same size, fixed, turbocharger. This disparity is due to a number of pertinent factors from the number of components, the materials of the components, the accuracy required in the manufacture and machining of the components, to the speed, accuracy, and repeatability of the actuator. The chart in FIG. 2 shows the comparative cost for the range of turbochargers from fixed to VTGs. Column "A" represents the benchmark cost of a fixed turbocharger for a given application. Column "B" represents the cost of a wastegated turbocharger for the same application; and column "D" represents the cost of a VTG for the same size and application.

Thus it can be seen that, for both technical reasons and cost drivers, there needs to be a relatively lower cost VTG. The target cost price for such a device needs to be in the range of 145% to 165% that of a simple, fixed, turbocharger.

SUMMARY OF THE INVENTION

The present invention relates to a simplified, low cost, VTG vane ring assembly providing both axial and radial constraint and support while reducing the part count substantially (41% for VTG part and 19% for the entire turbo), and accomplishes this by using a stamped adjusting ring assembly.

BRIEF DESCRIPTION OF THE DRAWINGS

The present invention is illustrated by way of example and not limitation in the accompanying drawings in which like reference numbers indicate similar parts, and in which:

FIG. 4A, B depict a pair of sections of a typical VTG turbocharger with rollers;

FIG. 5A, B, C depict vane arms of the invention;

FIG. 6A, B depict two views of a vane pack with a flat vane arm;

FIG. 7A, B depict two views of a vane pack with a tongue on the vane ring;

FIG. 8A, B depict two views of a vane pack with vane arms bent up;

FIG. 9A, B depict two views of a vane pack with vane arms bent down; and

FIG. 10A, B depict two views of a thin adjustment ring.

DETAILED DESCRIPTION OF THE INVENTION

Figure 1:
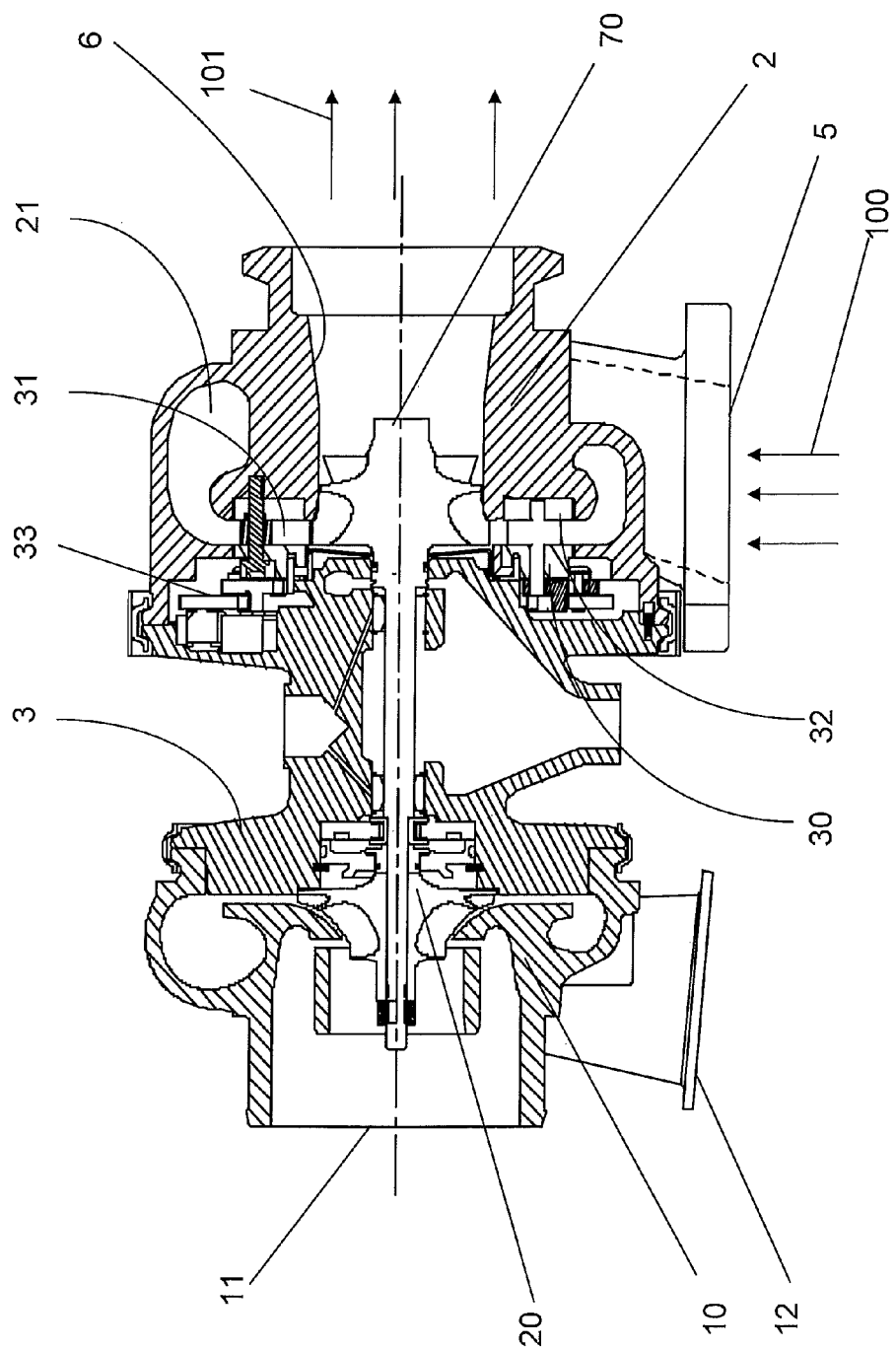
FIG. 1 depicts the section for a typical VTG turbocharger.
Figure 2:
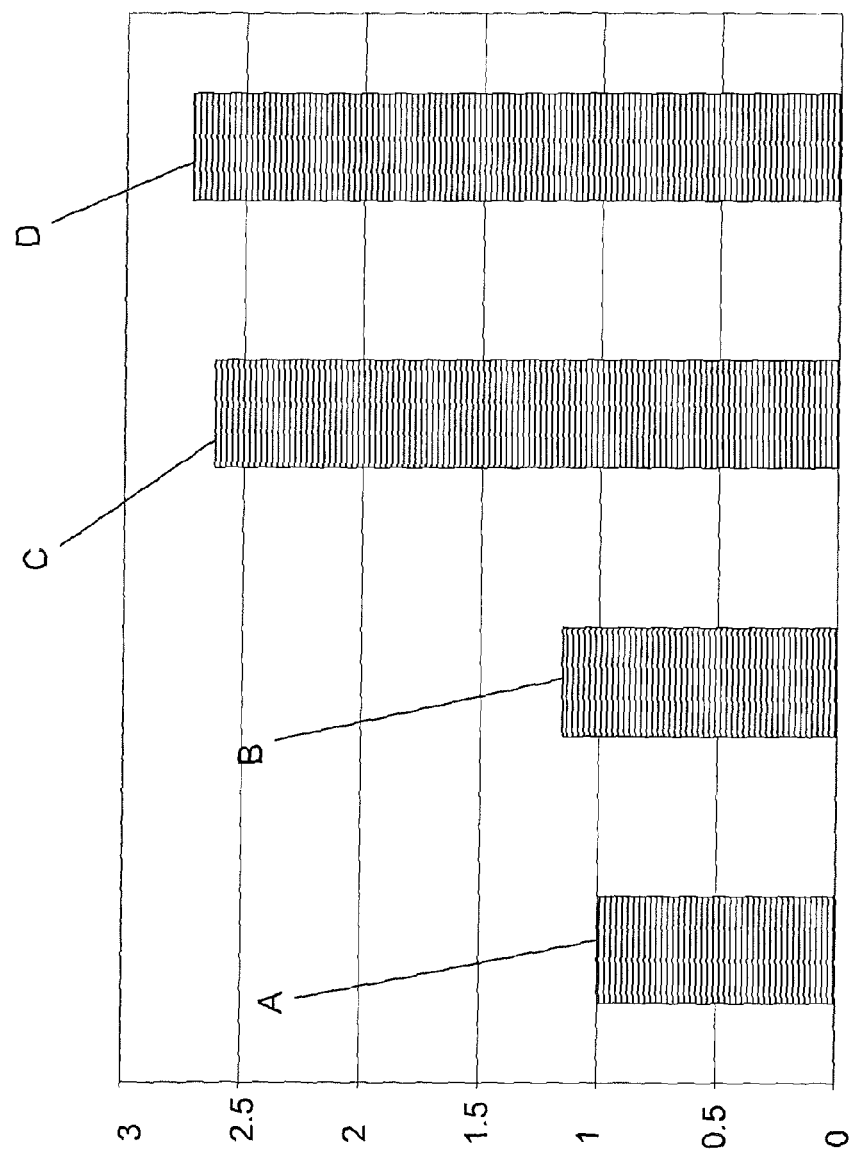
FIG. 2 is a chart showing turbocharger relative costs.
Figures 3A, 3B:
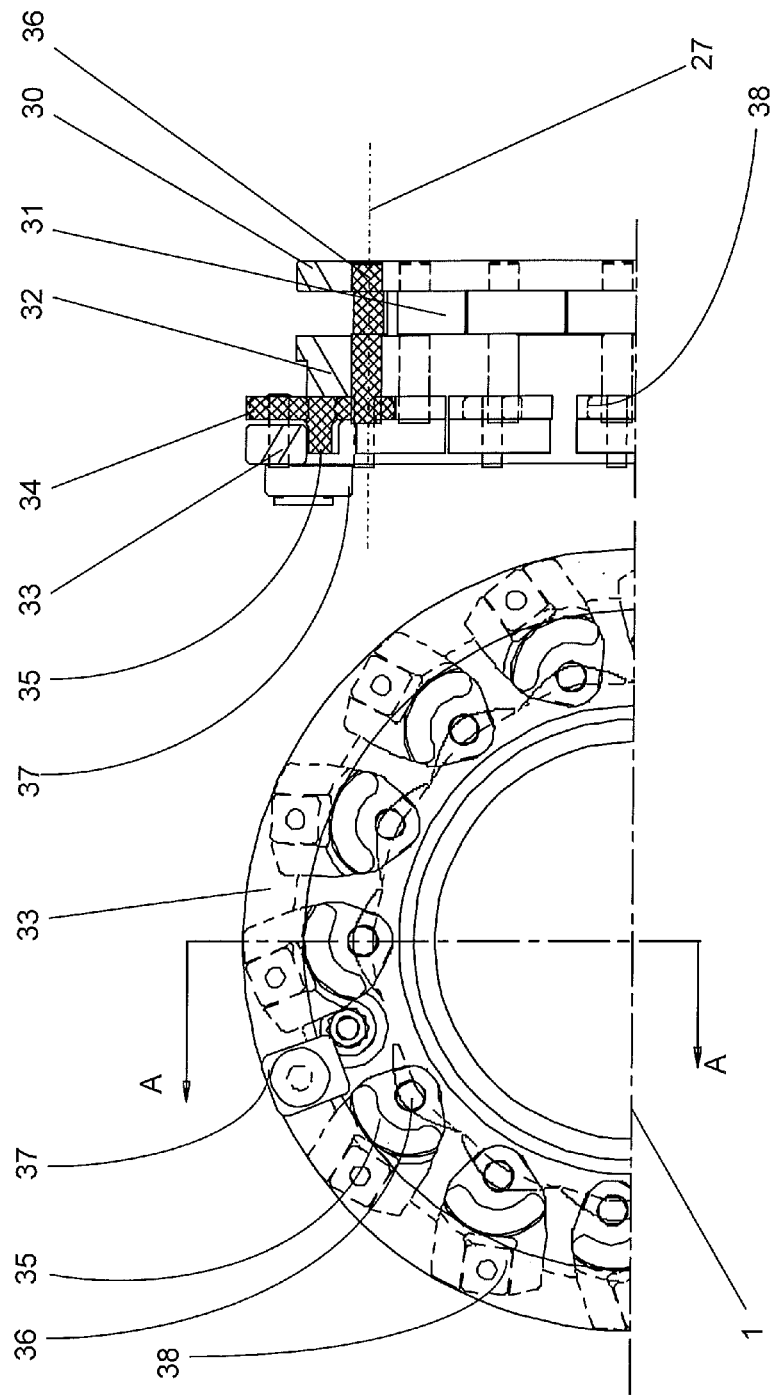
FIG. 3A, B depict a pair of sections of a typical VTG turbocharger with ramparts.

The use of multiple vanes, "wetted" by the exhaust flow and the mechanisms to control and move said vanes, add tremendous cost. This increase doubles and more the cost of the basic turbocharger. Therefore the inventors produced designs with components made from historically less capable manufacturing processes which reduced the part count for the vane pack by 40% and the total turbocharger part count by 19%. (This equates to a cost reduction of the total turbo of 4.6%, or a cost reduction of the vane pack of 15%). Column "C" in FIG. 2 depicts the part cost only segment of the cost reduction generated by the inventive design. In addition to these cost reductions, the inventors produced a design which removes much influence of the turbine housing distortion and corrosion associated with the turbine housing from the vane pack.

Because the typical method of support and constraint of the adjusting ring relies on expensive vane arms containing ramparts for both radial and axial positioning of the vane adjusting ring, or rollers which mount to the turbine housing or are located by features in the turbine housing, the inventors sought to isolate the axial and radial locations constraining the adjusting ring from the turbine housing.

To do this the inventors designed a counterbore in the upper vane ring which, when mated with a substantially cylindrical feature on the actuator ring provides both axial and radial support and constraint for the adjusting ring while removing the small turning blocks (plus their shafts and assembly cost) from the assembly. In doing so, not only was the part count and cost reduced, but the change in design resulted in a substantial reduction in capital costs of approximately a million dollars for a throughput of 100,000 units. The change also removed the actuator ring from the influence of corrosion build up in the turbine housing, which was causing jamming problems.

In the conventional design of FIGS. 4A and 4B, the turning of the vane is managed by the interaction of the rotation of the adjusting ring (29) about the turbo centerline (1), transferring that motion via the engagement of the fork in the vane arm through the small turning blocks (38) to the vane arms (34). The rotational motion of the small turning blocks (38) about the turbocharger centerline (1) results in rotational motion of the vane shafts (36) and vanes (31) about the vane shaft axes (27). In the interests of cost reduction, the inventors realized that the sliding action of the small turning blocks (3) on the fork in the vane arm (34) could be replaced by a simpler stamped or fine blanked vane arm (40) sliding against a slot in the adjusting ring (54).

The method of manufacture of a vane adjusting ring must be inherent in the design goals. The method of manufacture of the current vane adjusting ring the inventors selected was the fine blanking process. Fine blanked parts are usually flat sheet metal parts. The fine blanking process provides for quite accurate features, with tolerances around 0.001", and for features which have edges which are 90% perpendicular.

While tooling cost and accuracy for fine blanking is greater than that for conventional stamping, secondary processes such as shaving, milling broaching, reaming, and grinding are not required.

The inventors realized that by stamping or metal spinning some features into the adjusting ring and adding for the cost of alternate fine finishing processes, they could remove the need for the small turning blocks and their mounting shafts, remove the costly axial and radial ramparts or rollers used to locate the vane adjusting ring, and produce a lower cost assembly.

In the conventional fine blanked design, the shafts for the turning blocks are welded onto the adjusting ring. This process requires a very expensive, automated, inert-atmosphere, assembly-and-welding center which costs in excess of a million dollars. In order to reduce the cost, the inventors felt it imperative to avoid such a capital intensive manufacturing technique. Similarly by using stamping, and not the more esoteric fine blanking process for the extraction of the adjusting ring blank from the base sheet metal, and by forming the flanges, the outer being stamped in a castellated manner with the slots finished to size, and the inner flange being stamped then ground on the axial face and its outside diameter on the periphery, capital costs were reduced, and the per-part costs were slightly reduced. The big savings came from the part-count reduction. Not only was the new stamped adjusting ring itself more cost-effective, but also all the small turning blocks, their shafts, the processes involved in the assembly and welding of said parts were eliminated and the vane arms were less costly.

In all embodiments of the invention, the vane arms (40, 41, 42) contain an anvil feature (43) coined into the outside head of the vane arm. This feature is provided to produce line contacts between the vane arms and the surfaces of the slots in the adjusting ring even as the vane arms pivot relative to the adjusting ring. The contact surfaces may be hardened or coated to minimize wear. The anvil end of the vane arm can be straight, coplanar with the body of the vane arm as in FIG. 5A, or the anvil end can be bent down or up to match the design intent of the particular adjusting ring. In the FIG. 5B depiction of the vane arm, the anvil end of the vane arm (41) is bent up, and in the depiction in FIG. 5C, the anvil end of the vane arm (42) is bent down. In the exemplary embodiments of the invention, the joint between the vane shaft (36) and the vane arm (40, 41, 42) can consist of a pair of flats on the sides of the end of the vane shaft, matching a complementary shape opening in the head of the vane arm to prevent relative rotation between the vane arm (40, 41, 42) and the shaft (36); while the end of the shaft is swaged or peened to constrain the vane arm to the shaft. There are multiple methods such as pressing, splines, other shapes to prevent relative rotation of the vane arm to the shaft and similarly multiple methods such as orbital riveting, upsetting of some form, welding etc, to retain the vane arm on the shaft axially.

In these inventive configurations, the positional control of the adjusting ring axial and radial locations is greatly improved over the conventional design. With less fear of jamming, the tolerances between corresponding surfaces in the upper vane ring and the adjusting ring can be tighter than would be the case if the axial and radial locations of the adjusting ring were located in the turbine housing.

Another big gain by these inventive configurations is that the line of contact between the vane arm and the adjusting ring is at a greater radius than is possible with a turning block design for a given turbine housing architectural constraint. The result of this greater radius is that the moment arm is ureater. Further, the resolution of the vane position is improved. In a turning block configuration, the contact area is one cheek face of the block sliding on a cheek face of a fork. This design produces uniform loading along the contact area, more friction and more life. In the inventive configuration, the contact area is reduced to that of line contact. Friction will be less, while the propensity for there to be galling or wear in the contact zone is increased. The inventors realized that the trade-off between cost, friction, and wear is a balancing act; however, based on testing experience it is projected that the inventive design can satisfy or exceed all durability and performance requirements without requiring the costly elements of the conventional design.

In any of the following embodiments of the invention, lightening holes (59) can be fabricated into the flat surface between the two flanges to both reduce the mass, and thus inertia of the adjusting ring, and to provide clearance for the upset, or swage, on the top of the vane shaft (36) which mechanically locks the vane arm (40) to the vane shaft (36). In a variation to this feature, the flat upper (turbine housing facing) surface of the adjusting ring, between the two flanges, can be offset to provide the clearance for the upset or swage discussed above. This joggle or offset (60) is depicted in FIG. 10B.

In the first embodiment of the invention, the adjusting ring (54) is a stamped or produced by spun fabrication in which a pair of flanges (55, 58) are fabricated on both the inside and outside diameters of the flat adjustment ring blank. Both flanges are approximately perpendicular to the flat surface of the adjusting ring. The inner flange is to both radially and axially locate the adjusting ring; the outer flange is slotted to drive the vane arms.

The radial orientation of the adjusting ring (54) is controlled by an inwards facing inner diameter (62) in the upper vane ring (32). The outwards facing outer surface (61) of the flange on the inner flange of the adjusting ring is constrained radially by the inwards facing like surface (62) in the upper vane ring (32).

The axial orientation of the adjusting ring (54) is controlled by an upper-vane-ring (32) facing surface (63) on the adjusting ring inner flange (55), working in conjunction with an abutment (64), facing the adjusting ring (54).

The outer flange (58) of the adjusting ring of the first embodiment of the invention is bent towards the upper vane ring. Slots (50) are fabricated into the outer flange to provide control for the vane arms (40). The slots in the adjusting ring are matched to the number and orientation of the vane arms (40) mounted to the upper vane ring (32).

In the second embodiment of the invention, as depicted in FIGS. 8A and 8B, the adjusting ring (53) is a stamped or spun fabrication in which there is a flange (55) on the inside diameter of the flat adjustment ring. The inner flange is approximately perpendicular to the flat surface of the adjusting ring. The inner flange is to both radially and axially locate the adjusting ring.

The radial orientation of the adjusting ring (53) is controlled by an inwards facing inner diameter (62) in the upper vane ring (32). The outwards facing outer surface (61) of the flange on the inner diameter of the adjusting ring is constrained radially by the inwards facing like surface (62) in the upper vane ring (32).

The axial orientation of the adjusting ring (53) is controlled by an upper-vane-ring facing surface (63) on the adjusting ring inner flange (55), working in conjunction with an abutment (64) facing the adjusting ring (53).

Slots (50) are fabricated into the periphery of the adjusting ring to provide control for the vane arms (40). The slots in the adjusting ring are matched to the number and orientation of the upwards bent vane arms (41) mounted to the upper vane ring (32).

In the third embodiment of the invention, as depicted in FIGS. 9A and 9B the adjusting ring (54) is a stamped or metal spun fabrication in which there is a flange (55) on the inside diameter of the adjustment ring. The inner flange is approximately perpendicular to the flat surface of the adjusting ring. The inner flange is to both radially and axially locate the adjusting ring.

The radial orientation of the adjusting ring (54) is controlled by an inwards facing inner diameter (62) in the upper vane ring (32). The outwards facing surface (61) of the flange on the inner diameter of the adjusting ring is constrained radially by the inwards facing like surface (62) in the upper vane ring (32).

The axial orientation of the adjusting ring (54) is controlled by an upper-vane-ring facing surface (63) on the adjusting ring inner flange (55), working in conjunction with an abutment (64), facing the adjusting ring (54).

Slots (50) are fabricated into the outer flange to provide control for the vane arms (40). The slots in the adjusting ring are matched to the number and orientation of the vane arms (40) mounted to the upper vane ring (32).

In a variation to the first and second embodiments of the invention, as depicted in FIGS. 7A and 7B, the basic layout of the vane arms and adjusting ring is the same as that of the exemplary first, second, and third embodiments of the invention; but the location, and design of the area adjacent to the location of the large turning block (37) is altered. In the variations to the first and second embodiments of the invention, in the area adjacent to the large turning block (37), the outer flange (58) of the adjusting ring (54) is not curved, and the material is stamped, or fabricated, in such a manner as a flat tongue (57) exists. A hole is formed in this tongue for the shaft about which the large turning stone rotates. This change allows for the large turning stone to be located at a larger radius from the turbocharger centerline (1) thus increasing the moment arm of the large turning stone pivot, increasing the mechanical advantage, and lowering the load which needs to be applied to the turning stone. This inventive configuration also increases the resolution of the rotational position of the adjusting ring, vane arm, and thus the vane. While this may not seem to be a great advantage it can also reduce the load requirements of the VTG actuator, which can result in significant cost reduction.

In a further variation to any of the embodiments listed above, the material from which the adjusting ring is fabricated can be thinner and may require doublers for reinforcement in critical regions. FIGS. 10A and 10B depict the configuration of the exemplary first embodiment of the invention, which is fabricated out of 4 mm thick material. The variation depicted in FIGS. 10A and 10B is constructed of 3 mm material, and the stiffness and strength required is generated by the addition of doublers as desired. In the example given, a doubler (52) is added to the adjusting ring in the regions of the large turning stone (37) and both the inner and outer flanges.

Now that the invention has been described,

We claim:

1. A method of manufacturing a variable geometry turbocharger including an adjustment ring (54), the method comprising, in any order:
   (a) forming the adjustment ring by stamping a planar blank including a circular inner diameter and a circular outer diameter, forming a cylindrical inner flange (55) extending perpendicular to the planar blank by bending at the circular inner diameter of the adjustment ring (54), and forming slots in said outer diameter,
   (b) forming a vane ring (32) having a vane side, a vane arm side and an abutment (64), mounting vane shafts (36) rotatably through said vane ring, each shaft having a vane end and an arm end, mounting a vane (31) to the vane end and a vane arm (40, 42) to the arm end, each vane arm having a shaft end and an actuating end,
   (c) installing said adjustment ring (54) onto said vane ring (32) such that the at least one vane ring (32) abutment (64) is disposed to face the adjustment ring (54) and
   (d) bending the outer circumference of the adjustment ring (54) towards the vane ring (32), or bending the outer circumference of the adjustment ring (54) and the engagement ends of the vane arms (40, 42) towards the vane ring (32), such that said engagement ends of said vane arms engage the slots formed in the outer diameter of the adjustment ring, such that rotation of said adjustment ring (54) causes said vanes (31) to rotate in unison.

2. The method of claim 1, wherein the end of the vane arm (40, 42) has a rounded anvil head surface contacting the slots formed in the outer diameter of the adjustment ring.

3. The method according to claim 1, wherein the actuating end of each vane arm (40) extends radially outward.

4. The method according to claim 1, wherein the actuating end of each vane arm (42) is bent, extending in the direction away from the adjustment ring.

5. The method according to claim 1, further comprising hardening or chemically treating contact surfaces of said vane arm for reducing wear.

6. A variable geometry turbocharger having a turbine end and a compressor end, and including:
   at least one vane ring (32) having a vane side, a vane arm side and an abutment (64),
   a plurality of vane shafts (36) rotatably mounted through said vane ring, each shaft having a vane end and an arm end,
   a vane (31) mounted to the vane end of each vane shaft,
   a vane arm (40, 42) connected torque proof to the arm end of each vane shaft, each vane arm having a shaft end and an actuating end,
   an adjustment ring (54) having a vane ring facing surface and including:
      a cylindrical inner flange (55) formed by a bend in the adjustment ring (54) and extending from the vane ring facing surface and extending toward the vane ring (32), contacting and radially and axially locating said adjustment ring relative to said vane arm side of said at least one vane ring, and
      a radially outer edge bent in the axial direction towards the vane ring (32) and including one slot (50) respectively operably engaging each vane arm actuating end between opposing contact walls,
   wherein rotation of said adjustment ring (54) causes said vanes (31) to rotate in unison.

7. A method of manufacturing a variable geometry turbocharger including an adjustment ring (54), the method comprising, in any order:
   (a) forming the adjustment ring by stamping a planar blank including a circular inner diameter and a circular outer diameter, forming a cylindrical inner flange (55) extending perpendicular to the planar blank by bending at the circular inner diameter of the adjustment ring (54), and forming slots in said outer diameter, (b) forming a vane ring (32) having a vane side, a vane arm side and an abutment (64), mounting vane shafts (36) rotatably through said vane ring, each shaft having a vane end and an arm end, mounting a vane (31) to the vane end and a vane arm (40, 42) to the arm end, each vane arm having a shaft end and an actuating end, (c) installing said adjustment ring (54) onto said vane ring (32) such that the at least one vane ring (32) abutment (64) is disposed to face the adjustment ring (54) and (d) bending the outer circumference of the adjustment ring (53, 54) towards the vane ring (32), such that said engagement ends of said vane arms engage the slots formed in the outer diameter of the adjustment ring, such that rotation of said adjustment ring (54) causes said vanes (31) to rotate in unison.

\* \* \* \* \*